United States Patent
Van Gorp et al.

(10) Patent No.: US 9,688,439 B2
(45) Date of Patent: Jun. 27, 2017

(54) MAILPIECE WITH PERSONALIZED COMMUNICATION AND RETURN SLIP AND RELATED METHOD UTILIZING WRAPPER SYSTEM

(71) Applicant: BELL AND HOWELL, LLC, Durham, NC (US)

(72) Inventors: Mark Van Gorp, Cary, NC (US); Elizabeth L. Manning, Raleigh, NC (US); Gerard A. Derome, Cary, NC (US)

(73) Assignee: Bell and Howell, LLC, Durham, NC (US)

(*) Notice: Subject to any disclaimer, the term of this patent is extended or adjusted under 35 U.S.C. 154(b) by 143 days.

(21) Appl. No.: 14/015,637

(22) Filed: Aug. 30, 2013

(65) Prior Publication Data
US 2014/0001251 A1   Jan. 2, 2014

Related U.S. Application Data

(63) Continuation of application No. 12/702,696, filed on Feb. 9, 2010, now abandoned.

(51) Int. Cl.
| | |
|---|---|
| *B65D 27/06* | (2006.01) |
| *B42D 15/04* | (2006.01) |
| *B43M 3/04* | (2006.01) |
| *B43M 5/04* | (2006.01) |
| *G07B 17/00* | (2006.01) |
| *G06Q 30/02* | (2012.01) |

(52) U.S. Cl.
CPC ........... *B65D 27/06* (2013.01); *B42D 15/045* (2013.01); *B43M 3/04* (2013.01); *B43M 5/04* (2013.01); *G06Q 30/02* (2013.01); *G06Q 30/0207* (2013.01); *G06Q 30/0241* (2013.01); *G07B 17/00467* (2013.01); *G07B 2017/00491* (2013.01); *Y10T 29/49826* (2015.01)

(58) Field of Classification Search
CPC ...... B65D 27/06; B65D 27/34; B42D 15/045; B42D 15/08; G06Q 30/02
See application file for complete search history.

(56) References Cited

U.S. PATENT DOCUMENTS

| | | | |
|---|---|---|---|
| 2,279,164 | A | 4/1942 | Gettleman |
| 2,910,222 | A | 10/1959 | Bermingham, Jr. et al. |

(Continued)

FOREIGN PATENT DOCUMENTS

| | | |
|---|---|---|
| EP | 0 261 843 A2 | 3/1988 |
| EP | 0 712 782 A1 | 5/1996 |
| FR | 2 503 671 A1 | 10/1982 |

OTHER PUBLICATIONS

United States Office Action issued in U.S. Appl. No. 12/642,258 dated Apr. 18, 2012.

(Continued)

*Primary Examiner* — Derek Battisti
(74) *Attorney, Agent, or Firm* — Jenkins, Wilson, Taylor & Hunt, P.A.

(57) ABSTRACT

The present teachings relate to a mailpiece and method for assembling a mailpiece using a document processing system such as a wrapper system. The assembled mailpiece has outgoing and reply envelope functionality. In the outgoing format, the mailpiece may optionally contain advertisements, inserted documents, or coupons.

8 Claims, 10 Drawing Sheets

(56) References Cited

U.S. PATENT DOCUMENTS

| | | | |
|---|---|---|---|
| 3,941,309 A | 3/1976 | Gendron | |
| 3,955,751 A * | 5/1976 | Mayne | B65D 27/06 229/301 |
| 4,437,852 A | 3/1984 | Volk, Jr. et al. | |
| 4,524,903 A | 6/1985 | Vath | |
| 4,668,211 A | 5/1987 | Lubotta et al. | |
| 4,669,652 A | 6/1987 | Seguin | |
| 4,726,802 A | 2/1988 | Volk, Jr. | |
| 4,756,468 A | 7/1988 | Jenkins | |
| 4,896,823 A * | 1/1990 | Taylor | B42D 5/026 229/303 |
| 4,915,287 A | 4/1990 | Volk et al. | |
| 4,928,875 A | 5/1990 | Hutchinson | |
| 5,015,137 A * | 5/1991 | Stenner | B42C 3/00 229/301 |
| 5,052,977 A | 10/1991 | Irvine | |
| 5,076,489 A | 12/1991 | Steidinger | |
| 5,104,036 A | 4/1992 | Rutkowski et al. | |
| 5,169,060 A * | 12/1992 | Tighe | B65D 27/06 229/301 |
| 5,174,493 A * | 12/1992 | File | B65D 27/06 229/301 |
| 5,174,494 A | 12/1992 | Ashby | |
| 5,201,464 A | 4/1993 | File | |
| 5,289,972 A | 3/1994 | Sauerwine et al. | |
| 5,352,177 A | 10/1994 | Walter | |
| 5,372,302 A * | 12/1994 | Loch | B65D 27/06 229/305 |
| 5,398,867 A | 3/1995 | Murphy | |
| 5,402,934 A * | 4/1995 | Sauerwine | B65D 27/06 229/303 |
| 5,425,500 A * | 6/1995 | Sauerwine | B65D 27/06 229/303 |
| 5,513,795 A | 5/1996 | Sauerwine | |
| 5,553,774 A | 9/1996 | Goodno | |
| 5,598,970 A * | 2/1997 | Mudry | B65D 27/06 229/300 |
| 5,794,409 A | 8/1998 | Akridge et al. | |
| 5,865,717 A | 2/1999 | Fabel | |
| 5,893,512 A | 4/1999 | Diedrich | |
| 5,997,457 A | 12/1999 | Stenner | |
| 6,041,999 A | 3/2000 | Petkovsek | |
| 6,053,855 A | 4/2000 | Stenner | |
| 6,224,530 B1 | 5/2001 | Okelmann et al. | |
| 6,412,687 B1 * | 7/2002 | Steitz | B42D 15/08 229/305 |
| 6,431,437 B1 | 8/2002 | Lombardo et al. | |
| 6,893,387 B1 | 5/2005 | Dahlquist | |
| 7,100,348 B2 | 9/2006 | Mertens | |
| 7,231,750 B2 | 6/2007 | Woodman et al. | |
| 7,254,931 B2 | 8/2007 | Stemmle et al. | |
| 7,699,352 B2 | 4/2010 | Stemmle et al. | |
| 8,544,720 B2 | 10/2013 | Van Gorp et al. | |
| 9,604,493 B2 | 3/2017 | Van Gorp et al. | |
| 2002/0008135 A1 | 1/2002 | Kim | |
| 2002/0038817 A1 * | 4/2002 | Black | B42D 15/08 229/92.3 |
| 2005/0224566 A1 | 10/2005 | Butler | |
| 2006/0182918 A1 | 8/2006 | Dahbura et al. | |
| 2006/0266808 A1 * | 11/2006 | DeLaVergne | B65D 27/06 229/72 |
| 2007/0131739 A1 | 6/2007 | Ponti | |
| 2011/0121063 A1 | 5/2011 | Van Gorp et al. | |
| 2011/0121064 A1 | 5/2011 | Van Gorp et al. | |
| 2011/0192892 A1 | 8/2011 | Van Gorp et al. | |

OTHER PUBLICATIONS

United States Office Action issued in U.S. Appl. No. 12/642,539 dated Apr. 5, 2012.
Entire Prosecution History of U.S. Appl. No. 12/702,696, filed on Feb. 9, 2010 entitled Mailpiece With Personalized Communication and Return Slip and Related Method Utilizing Wrapper System.
Buckle Folder video; <http://www.youtube.com/watch?v=u8MyaOFxTJY>.
Inveloper video; <http://www.youtube.com/watch?v=Vw__JgE8bDO8>.
Restriction Requirement for U.S. Appl. No. 12/642,539 dated Feb. 13, 2012.
Restriction Requirement for U.S. Appl. No. 12/642,258 dated Feb. 21, 2012.
Restriction Requirement for U.S. Appl. No. 12/702,696 dated Mar. 1, 2012.
Non-Final Office Action for U.S. Appl. No. 12/702,696 dated Jun. 21, 2012.
Final Office Action for U.S. Appl. No. 12/642,258 dated Aug. 3, 2012.
Final Office Action for U.S. Appl. No. 12/642,539 dated Sep. 7, 2012.
Final Office Action for U.S. Appl. No. 12/702,696 dated Mar. 1, 2013.
Non-Final Office Action for U.S. Appl. No. 12/642,539 dated Apr. 26, 2013.
Examiner's Answer in response to the Appeal Brief filed on Feb. 28, 2013, issued in U.S. Appl. No. 12/642,258 dated May 28, 2013.
Notice of Allowance for U.S. Appl. No. 12/642,539 dated Jul. 29, 2013.
Notice of Allowance for U.S. Appl. No. 12/642,258 dated Apr. 21, 2016.
Office Action for EP Application 11153264 dated Apr. 12, 2016.
Notice of Allowance for U.S. Appl. No. 12/642,258 dated Nov. 18, 2016.
Labeled diagrams of "Opened envelope with return envelope and payment coupon," "Paper sheet with return envelope open," and "Envelope as mailed to car owner," 3 pages.
Ecoenvelopes website, Oct. 9, 2009. <http://ecoenvelopes.com/index.php?page=products<.
Exhibit 1: Declaration of Walter S. Conard, Renewal Notice from Illinois DMV to Walter S. Conard, 2009.
Extended European Search Report for European Application No. 11153264.4 dated Apr. 13, 2011.
Declaration for Compliance with Duty of Disclosure Under 37 C.F.R. 37 C.F.R. § 1.56 executed by Walter S. Conard on Jul. 13, 2012.

* cited by examiner

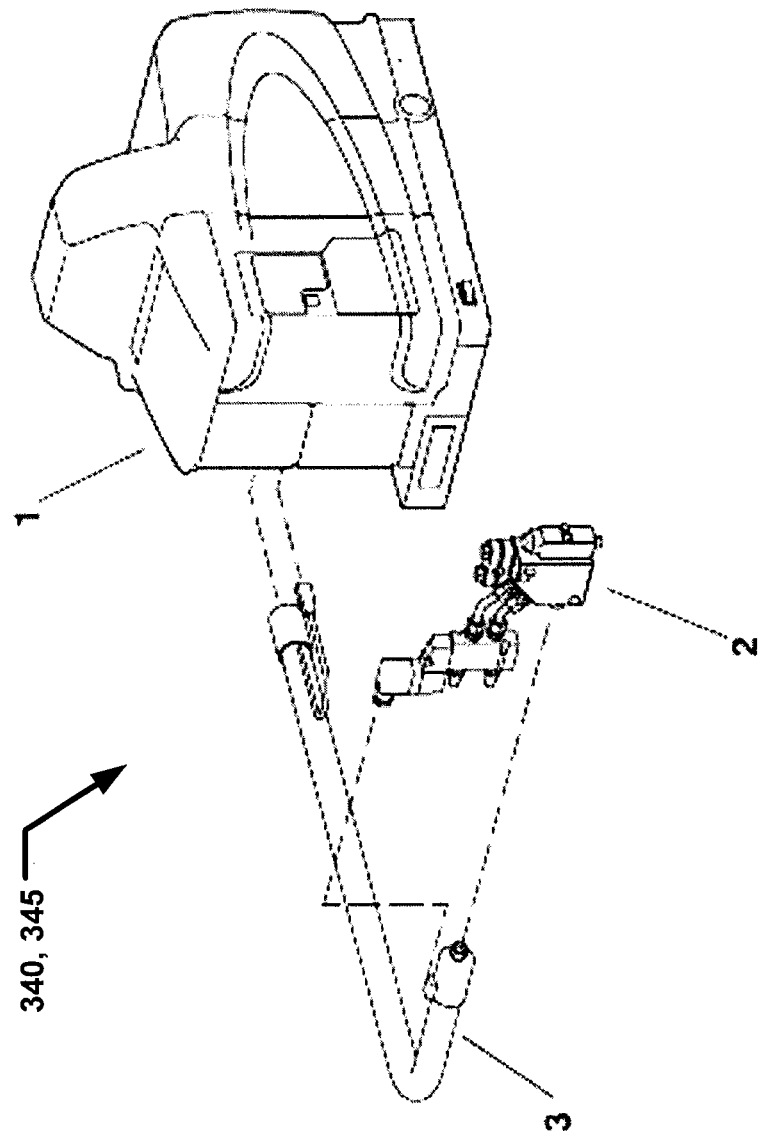

MAILPIECE WITH PERSONALIZED COMMUNICATION AND RETURN SLIP AND RELATED METHOD UTILIZING WRAPPER SYSTEM

RELATED APPLICATIONS

This application is a Continuation of U.S. application Ser. No. 12/702,696, filed on Feb. 9, 2010, which relates to copending application Ser. No. 12/642,539, filed on Dec. 18, 2009, entitled ARTICLE OF MANUFACTURE FOR USAGE AS AN INTEGRATED BIDIRECTIONAL MAILPIECE AND METHOD OF MANUFACTURING INTEGRATED BIDIRECTIONAL MAILPIECES, and copending application Ser. No. 12/642,258, filed on Dec. 18, 2009, entitled METHOD AND SYSTEM TO MANUFACTURE AN INTEGRATED RETURN MAIL PIECE ON WRAPPING DOCUMENT PROCESSING SYSTEM, the disclosures of which are entirely incorporated herein by reference.

TECHNICAL FIELD

The present subject matter relates to mailpieces printed on document processing equipment that individually wraps each printed form in a manner that produces a mailpiece that is an outbound (i.e. going to a customer) envelope containing a reply envelope (i.e. returned to a business) wrapped within the outgoing mailpiece.

BACKGROUND

Current mail production operations have seen many changes and trends over the past decade, including increases in costs, shrinking margins, lower volumes, market consolidation, changing postal regulations, and increased competition. What has remained constant, however, is the need to produce communication pieces that derive a desired response, and are produced with integrity and in a highly automated and efficient manner.

The current systems that mailers use for creating the majority of their work range from low-speed inserters with no intelligence to high-speed finishing systems that are intelligent and connected to some form of an automated document factory. The systems used are typically determined by the application being processed and the capital investment available for growth.

Existing inserting systems have many factors that determine their overall speed and efficiency. Even high-end systems have limitations that prevent them from realizing their maximum potential. These limitations include: the number of supported input channels; the speed at which materials are personalized and assembled; and the number of stops from jams or other errors; the rate at which inserts can be added. The lack of a continuous flow of material through the inserter due to the requirement to have a stationary envelope at the point where material is inserted into the envelope is a factor in achieving high throughput and a low rate of jam stops.

Current document processing approaches involve creating a document, such as a statement, to be folded and inserted into a pre-manufactured envelope. The envelope is frequently windowed to allow the address printed on the document to be seen through the window. This approach is favored for personal mail versus printing the address after the mailpiece manufacture is completed. The window approach is used to insure that the contents of the mailpiece and address match. In addition, coupons and inserts are separately printed and cut and matched with the document prior to insertion into the windowed envelope. Frequently, a return mail envelope is separately manufactured and inserted into the envelope with the other material. This process and inserter system are very complex with multiple feeders and cutters and numerous pieces of material that need to be manufactured in separate processes and loaded numerous times on to the inserter.

In addition to improving the document processing system, there is frequently additional cost associated with material that is included in the mailpiece. For example, the return envelope needs to be a #10 in size since the slip/stub that is must be returned is the full width of the statement.

Hence a need exists for a mail preparation process that uses a prepared group of forms printed on a continuous paper roll which is processed on a wrapping document processing system that eliminates the separate steps mentioned above and allows for a smaller integrated return slip that will fit in a reply envelope that is smaller in size such as a #7 reply envelope.

SUMMARY

It is desirable to provide a method for assembling a mailpiece having outgoing and reply envelope functionality by way of a wrapper. The method includes printing information on both sides of a sheet of paper. The printed sheet of paper includes a first address printed on the first side of the sheet of paper wherein the first address is associated with the outgoing envelope. A personalized communication and a detachable return slip are printed on the second side of the sheet of paper. The personalized communication is associated with an addressee identified in the first address. The return slip is capable of being inserted into the reply envelope in an unfolded state. A reply envelope is added and is to be wrapped within the sheet of paper. The paper is folded along fold lines such that the first address is viewable on an exterior of the folded sheet, and the personalized communication and detachable return slip are concealed in an interior of the folded sheet facing the reply envelope. The folded paper is sealed along one of more adhesive portions positioned along one or more side edges of the folded sheet. The folded sheet is cut from a continuous web of paper to form the assembled mailpiece.

It is further desirable to provide a mailpiece having outgoing and reply envelope functionality to be assembled by way of a wrapper. The mailpiece comprises a reply envelope to be inserted and wrapped within the mailpiece by way of the wrapper. The mailpiece is further comprises of a sheet of paper including printed material on first and second sides of the sheet of paper. The sheet of paper includes a first address printed on the first side of the sheet of paper wherein the first address is associated with the outgoing envelope. A personalized communication and a detachable return slip are printed on the second side of the sheet of paper. The personalized communication is associated with an addressee identified in the first address. The detachable return slip is capable of being inserted into the reply envelope in an unfolded state after detachment from the sheet of paper and an adjacent stub. Fold lines extend across a width of the sheet of paper such that the sheet of paper is folded along the fold lines by the wrapper and the reply envelope is wrapped therein. The first side of the sheet of paper forms an exterior of the mailpiece. At least one adhesive region is positioned on at least the second side of the sheet of paper sealing the mailpiece.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A is a representative drawing of a hot glue application system.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present teachings alleviate one or more of the above noted problems by providing a process to provide an integrated mailpiece using a document processing system such as a wrapping document processing system. The manufactured mailpiece has outgoing and reply envelope functionality and includes a personalized communication and return slip. In the outgoing format, the integrated mailpiece may optionally contain printed advertisements, inserted documents, or coupons. Other documents may be added to the mailpiece as inserts.

A plurality of forms containing the group of items listed above are aggregated and printed on a paper roll. Some types of glue strips and perforation tear or fold lines may be added to the roll of paper before it enters the printer or immediately after printing. The finished printed roll of paper is processed on a wrapping document processing system that will add glue strips and perforations as needed and wrap the prepared paper along fold lines to form an integrated mailpiece with outbound and reply functionality. The resulting strip of paper is cut to form the individual outbound mailpieces. The outbound mailpiece may optionally contain other documents which may be added as inserts in addition to the reply envelope.

The present teachings provide an eco-friendly document processing system that is dynamically capable of creating personalized communications such as, but not limited to, bills and statements, at significant savings over conventional mailpieces. The present teachings enable the creation of mail documents in all standard formats on a single machine, delivers significant improvements in efficiency, and dramatically reduces paper costs and usage.

In certain examples, the present teachings provide for a document processing system using roll-fed paper material to create an integrated mailpiece that replaces the traditional elements in a statement or invoice and return slip that is sized to fit into a small reply envelope. The reply envelope is inserted at the single sheet wrapping and sealing phase.

Figure 1:
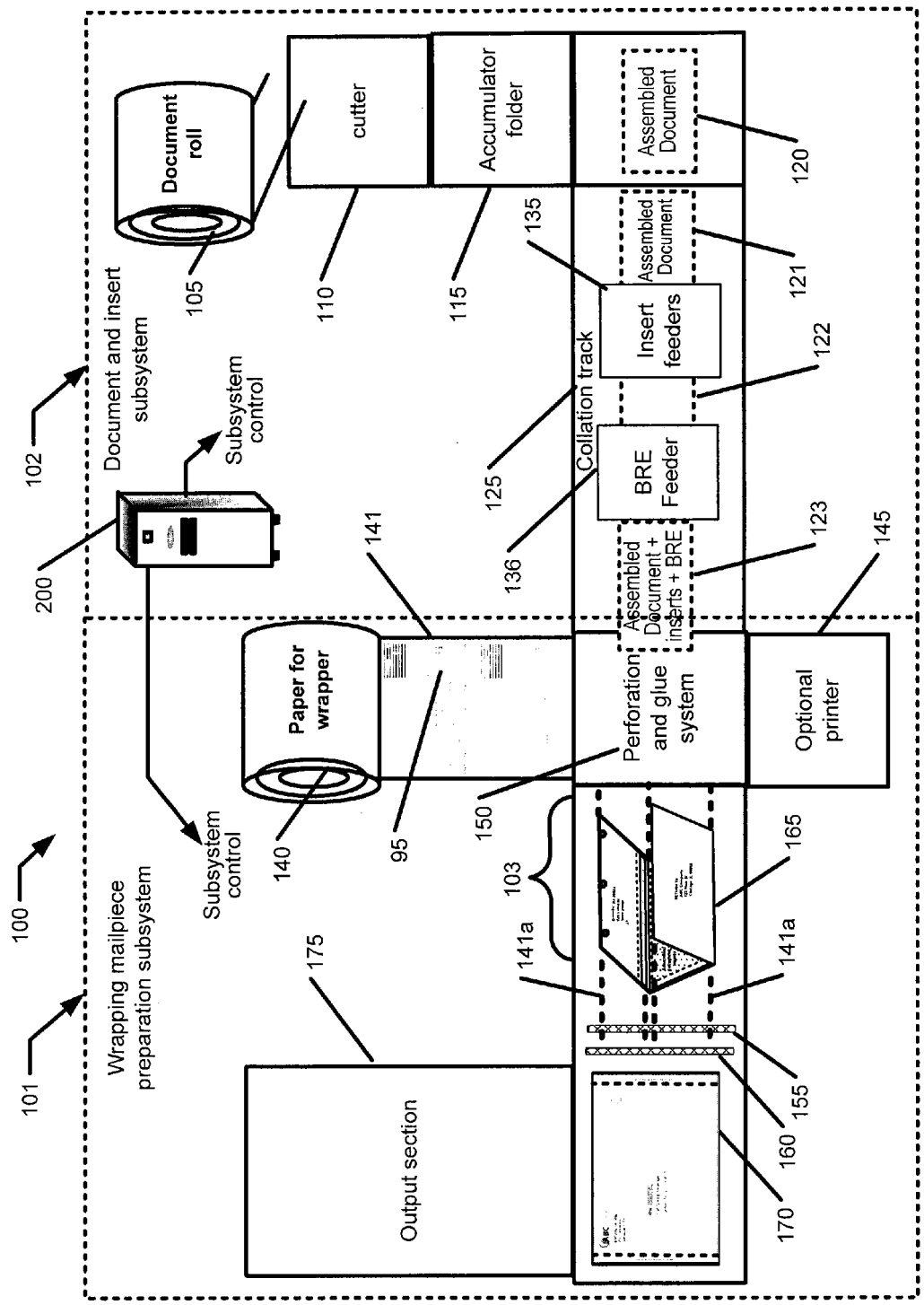
FIG. 1 is a diagram of a wrapping document processing system that can create a mailpiece from single page forms printed on a paper roll and insert a reply envelope.

Reference now is made in detail to the examples illustrated in the accompanying drawings and discussed below. FIG. 1 illustrates a wrapping document processing system 100. As illustrated, there are two major subsystems 101 and 102. The first subsystem is the wrapping mailpiece preparation subsystem 101, which forms mailpiece 170 from a single page form (FIGS. 2A, 2B), that originates on a paper roll 140. The Bowe Bell+Howell MAILStream Inveloper is an example of a machine that contains the technology needed to configure the wrapping mailpiece preparation subsystem 101 plus the insert feeders 136 and 135 of the document and insert subsystem 102. The mailpiece is characterized by the formation of an outbound mailpiece which is created from numerous single page forms printed on a continuous roll of paper and contains a large format personalized communication and return slip. The mailpiece is not cut from the continuous web of paper 141 containing a stream of printed forms 95 until the mailpiece 170 is completed/assembled.

The document and insert subsystem 102 is the second subsystem. This subsystem contains at least one feeder 136 to feed the reply envelope onto the paper web 141 as it is wrapped and sealed in section 103. The remainder of the subsystem 102 is optional to the formation of mailpiece 170. The subsystem 102 can be readily integrated onto the wrapping mailpiece preparation subsystem 101 with standard components, as understood by those skilled in the art. The subsystems 101 and 102 may or may not be under the control of one or more control processors 200, which coordinates and controls the actions of one or more devices within the subsystems 101 and 102.

The wrapping mailpiece preparation subsystem, referred to as subsystem 101 hereinafter, is designed to take pre-print forms 95 on a paper roll 140 and prepare the roll of paper 140 to be formed into a mailpiece. Details of the form are discussed below with respect to FIGS. 2A and 2B. The continuous web of paper 141, from the paper roll 140, is fed under the perforation and glue section 150 to an optional printer 145. Additional data can be printed on the forms as the paper web passes through the printer 145. For example, if form 95 did not contain any customer specific data, then the customer's address maybe printed by the printer 145.

Mailpiece designers skilled in the art can add any required additional printed data as desired with the printer 145 option. The continuous web 141 proceeds to the perforation and glue section 150 where various glue types are applied and longitudinal perforations are added as required. FIG. 3 provides additional detail for the operation of the perforation and glue section 150. The continuous web 141 is reoriented in direction by 90 degrees in the perforation and glue section 150 and fed into the wrapping section 103 where individual panels 92, 94 are wrapped along the fold lines 40 and 45, as shown in FIGS. 2A and 2B.

Following the wrapping step 103, which also seals any pressure sensitive or contact glue strips, the outbound mailpiece 165, which is still a part of the continuous web 141, goes into a set of perforation rollers 155 and then into a set of cutter rollers 160 for cutting the out bound mailpiece 165 from the wrapped (folded) continuous web 141a to form the finished mailpiece 170. The finished mailpieces 170 will be transferred to the output section 175 where the finished mailpieces will be stacked and grouped into mail trays, either automatically or with operator assistance. The perforation rollers 155 and 156 (FIG. 3) can be designed in numerous styles based on the positioning of the perforation cutters. These variations make it possible to cut all layers of the finished mailpiece 170, cut only select layers, and limit the perforation cuts to only a partial section instead of the full width as required for perforation 75 (FIGS. 2A and 2B).

Figure 7:
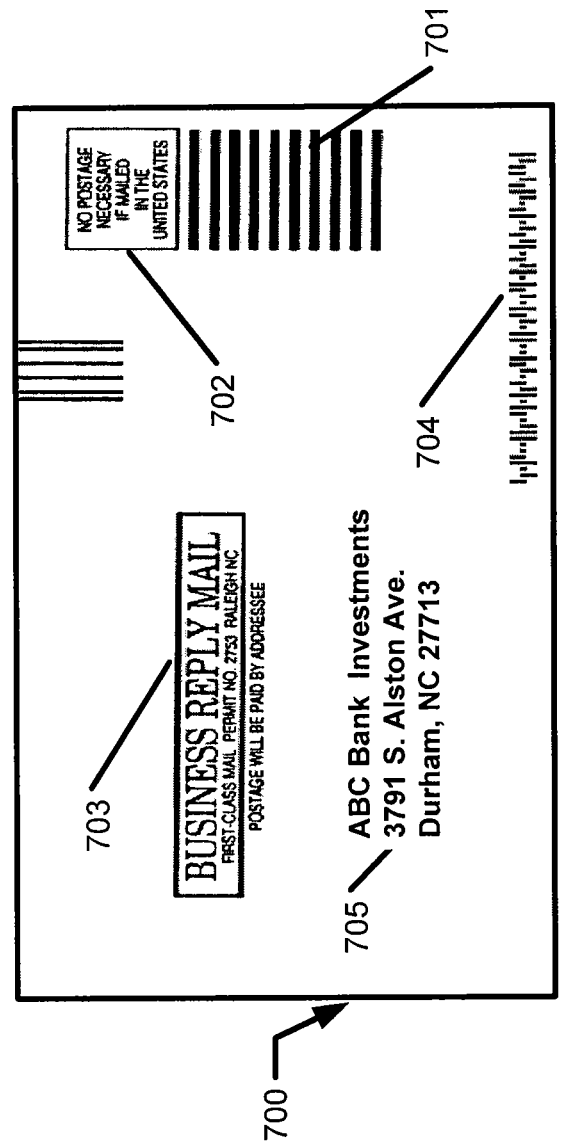
FIG. 7 is an exemplary reply mailpiece showing the markings required for business reply mail.

The document and insert subsystem 102 is required if inserts are desired to be part of the finished mailpiece 170. Documents are either on a roll of paper 105 or in a fan folded stack of paper. The documents are fed into a cutter 110 to make individual sheets and then into an accumulator folder 115 to accumulate multiple sheets that make up the document and then fold the sheets into a form facter compatable with the space available in the wrapped mailpiece. The Bowe Bell+Howell 310 High Speed Cutter and the 4911 Combined Accumulator/folder are representative of the technology used for items 110 and 115, respectively. The assembled document 120 is placed on a collation track 125. The collation track 125 will advance the document 121 under an insert feeder 135 where an insert will be added to form a collection material including inserts and a document 122. If additional inserts are required, additional feeders, similar to 135 are used to add inserts to the collection of material to be wrapped into the out bound mailpiece 165. One of the feeders 136 will feed a reply envelope, such as business reply envelope 700, onto the collation track. The business reply envelope 700 for this example is a #7 envelope that measures approximately 3.75 inches by 6.75 inches which is an ideal size for a return slip 72 and an accompanying check if required. As shown in FIG. 7, the business reply envelope 700 contains features 701 through 704 which can easily be added to the return envelope to meet postal authority business reply standards. Feature 701 is a machine readable indicator that this is a business reply mailpiece. Feature 702 is an indication of business reply postage requirements, feature 703 is a human readable indication that the mailpiece is a business reply mailpiece along with an indication of the class of delivery service requested and a permit number for postage billing and 704 is the delivery point barcode corresponding to the return address. Other formats of the return envelope can be implemented by those skilled in the art, with the minimum version containing only the return address 705.

Figure 2A:
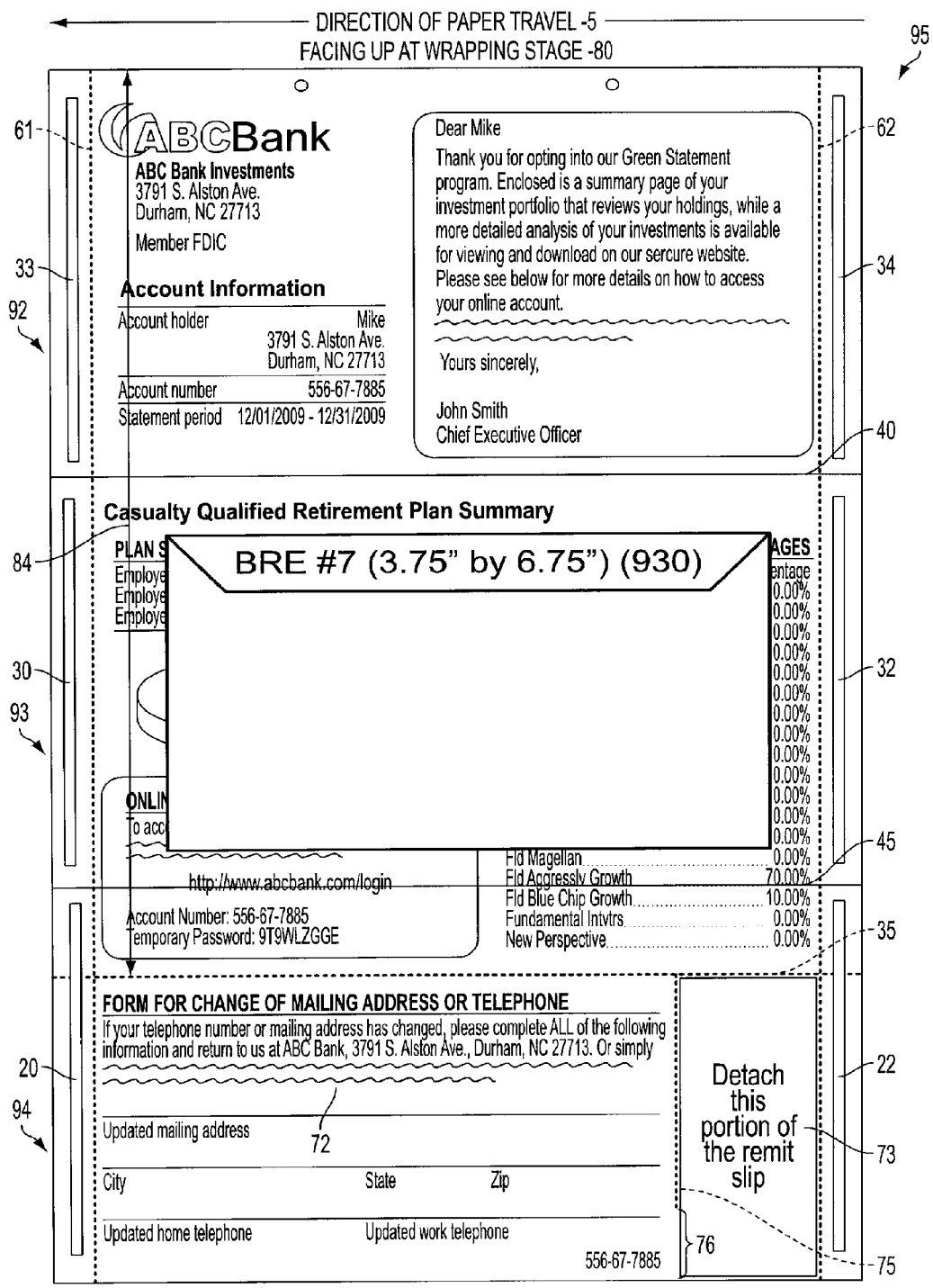
FIGS. 2A and 2B are an exemplary single page personalized communication and return slip for the inside of the to be assembled mailpiece and an outside of the to be assembled mailpiece, respectively.
Figure 2B:
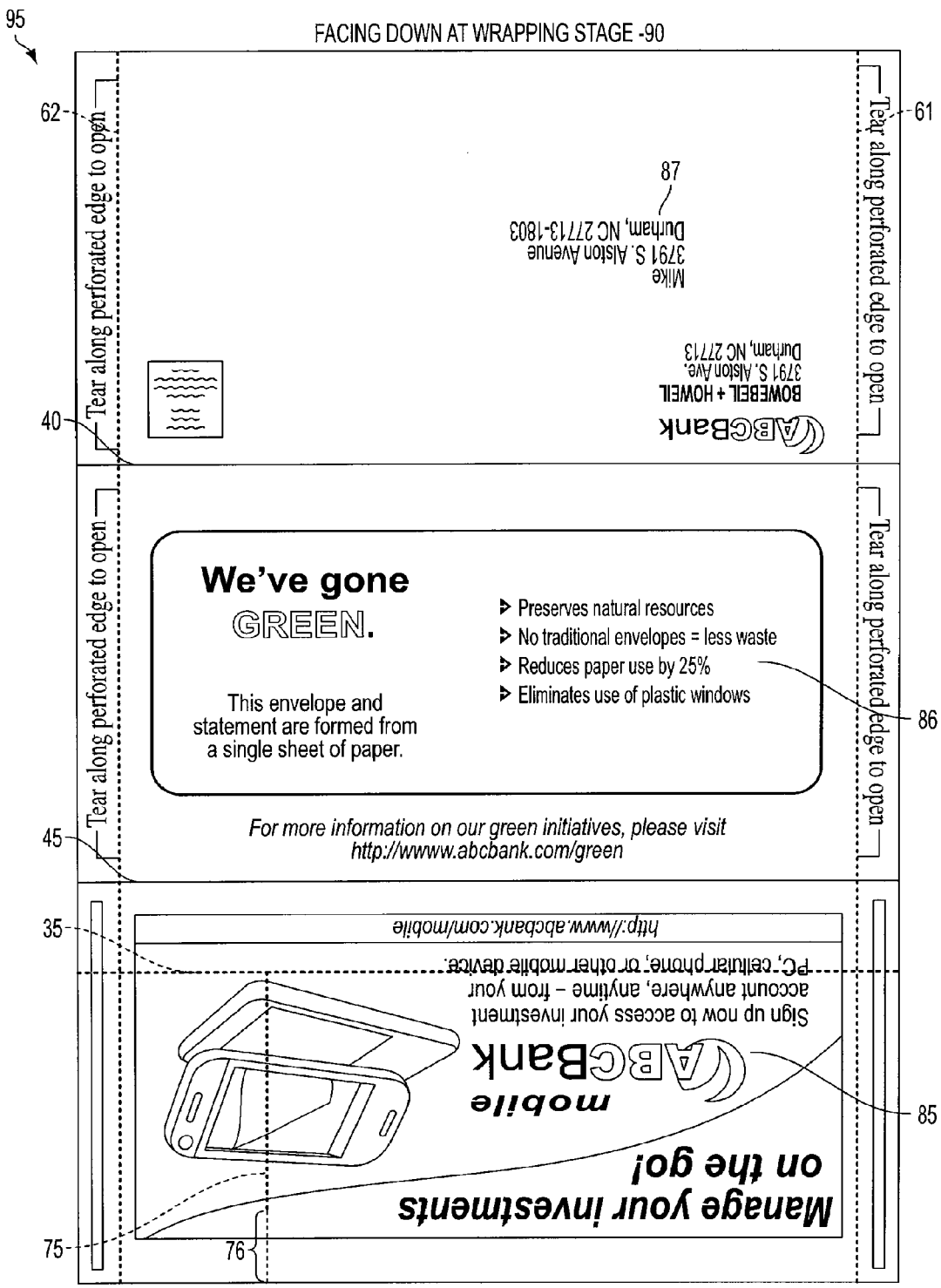
Figure 3:
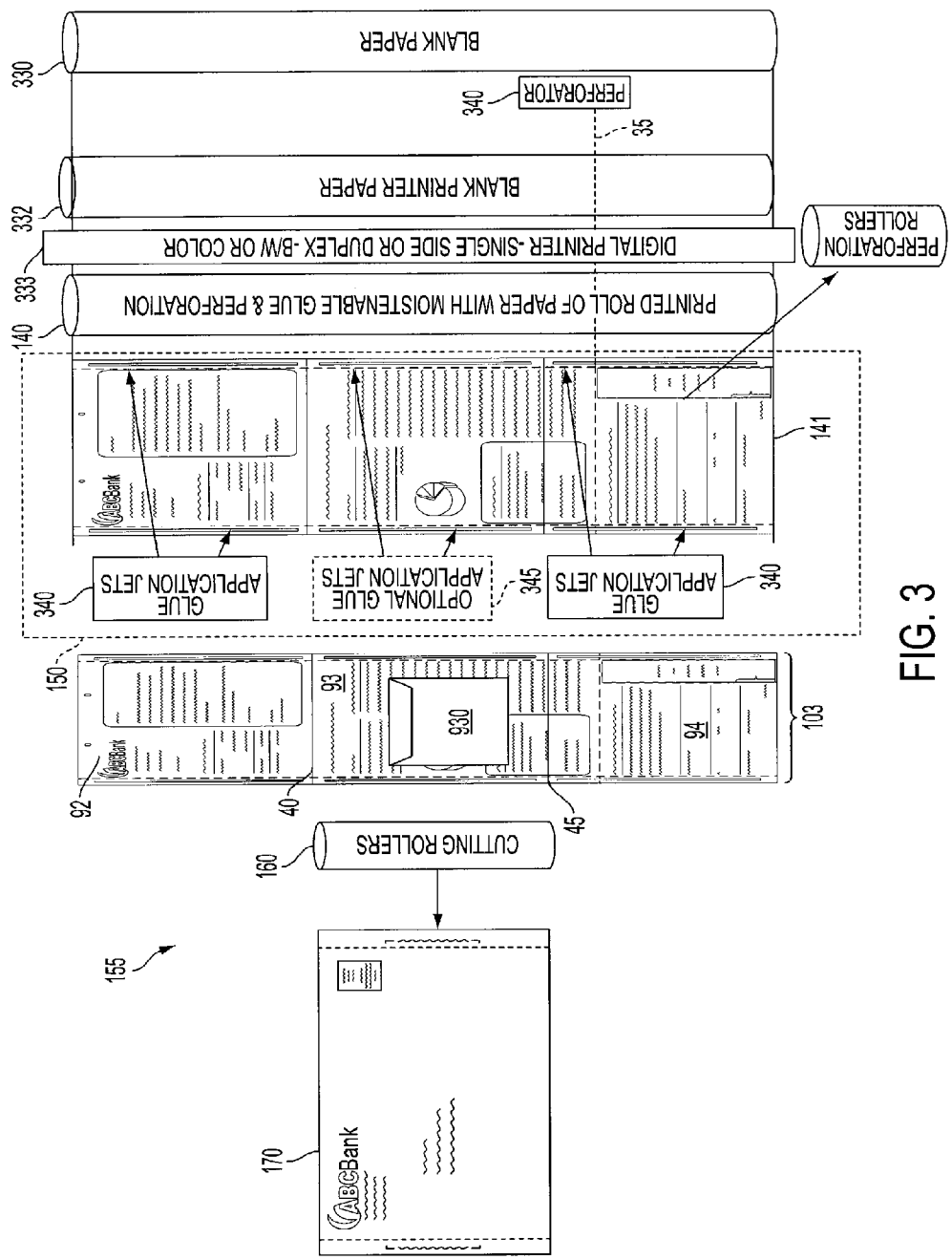
FIG. 3 is a diagrammatic representative of the components of the wrapping system needed to create a multi-functional mailpiece.

The collation track 125 either moves the documents at the same speed as the paper web 141 or synchronizes the speed of the last group of inserts and document 123 so that the inserts and document can be placed onto the correct area of the center panel 93 (FIG. 2A). The components and features of both the wrapping mailpiece preparation subsystem 101 and the document and insert subsystem 102 can be reconfigured, by those skilled in the art, to support numerous mailpiece designs that are suitable for operation on a wrapping document processing system 100.

Figure 1A:
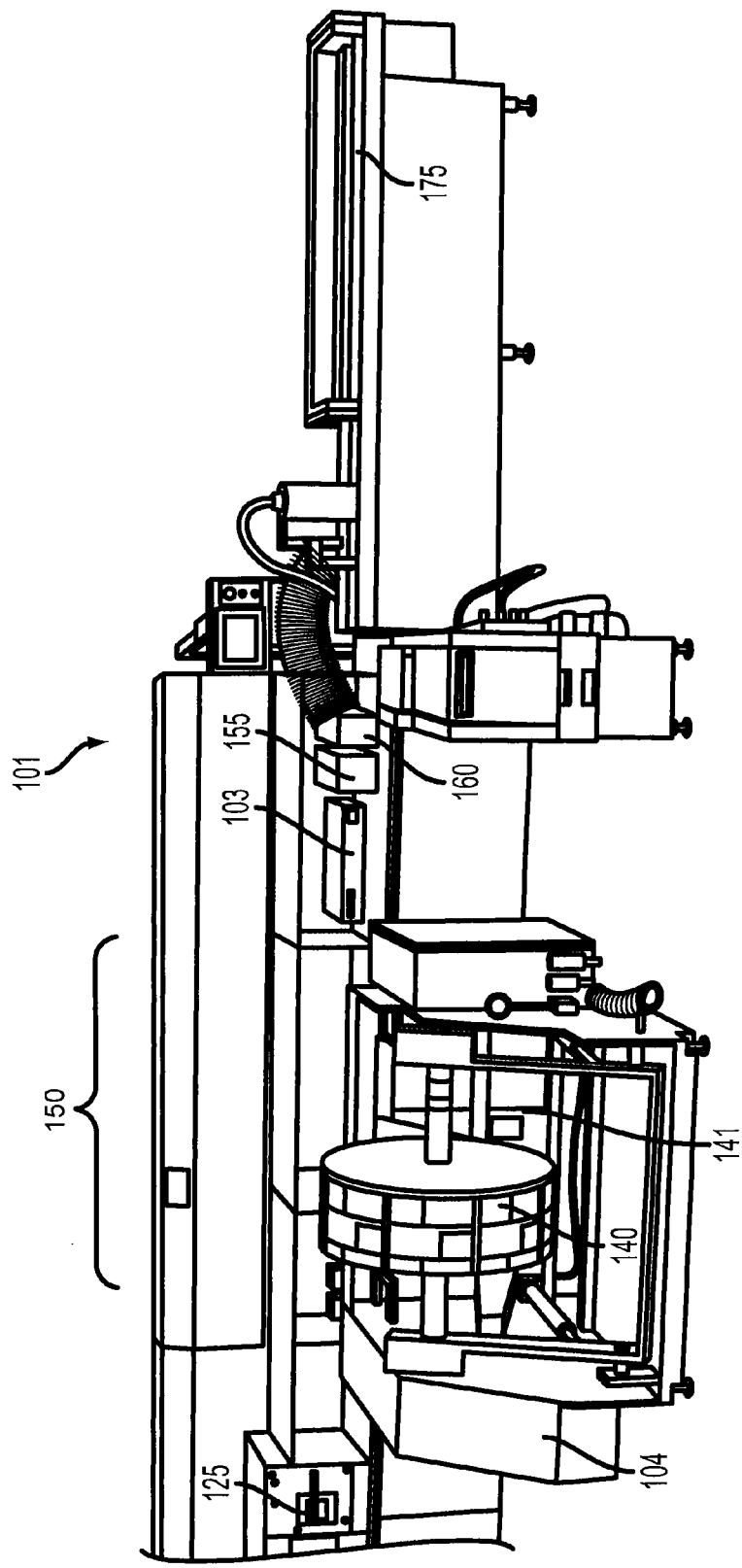
FIG. 1A is a representation of a wrapping document processing system with emphasis on the wrapping mailpiece preparation subsystem.

In FIG. 1A, a representation of a wrapping document processing system with emphasis on the wrapping mailpiece preparation subsystem 101 is shown. The majority of FIG. 1A is devoted to the wrapping mailpiece preparation subsystem 101 with only the trailing edge of the collation track 125 shown for the document and insert subsystem 102. The paper roll 140 is shown installed on the support and unwind mechanism 104, with the paper web 141 entering the perforation and glue system 150. The optional printer is not shown, as well as the subcomponents of the peroration and glue system 150. A portion of the wrapping section 103 is visible next the perforation rollers 155 and the cutting rollers 160. The output section is not shown but it is attached at location 175.

Referring to FIGS. 2A and 2B for an exemplary illustration of form 95 that demonstrates many of the features that may be included in the mailpiece. FIG. 2A shows the face-up side of the form 80 as it comes off the paper roll 140 and as it transitions into the wrapping section 103. The direction of travel through the machine is indicated by directional arrow 5. FIG. 2B is the face-down side of the form 90 as it comes off the paper roll 140 and as it transitions into the wrapping section 103. To correctly visualize the face-down or backside of the form 90 as it is duplex printed, rotate form 90 counterclockwise under the upward facing form 80. As a result, the printed material 86 is directly underneath the optional insert section of form 80. The form 80 is divided into three panels 92, 93 and 94 which will be folded in the wrapping section 103. Each panel can contain a variety of options for the printed material. The example in FIGS. 2A and 2B is not intended to be limiting in nature as other possibilities are available depending the desired type of communication. The sample form 95 is an example of a bank statement 84 and a change of address slip 72 that are printed primarily on panels 92 and 93, but overlap across the fold line 45 into panel 94. Perforation 35 is produced either during the preparation of the printer ready roll of paper 332 (FIG. 3) or is added by a perforation wheel in the perforation and glue section 150.

Perforation 35 is needed to allow the customer to remove the statement from the return slip 72. Perforation 75 is required to allow for easy removal of the detachable and disposed of section 73 of the return slip 72. Perforation 75 does not extend to the edge of the sheet of paper in order to prevent the perforation from tearing during the wrapping operation 103. As a result, the perforation stops 76 approximately 0.12 inches from the edge to the paper web 141. The required length of the no perforation area 76 is dependant on the wrapper 101 design. The removal of section 73 is required for the return slip to fit in the small reply envelope in an unfolded state. For the current example, the return slip is a change of address form. The return slip 72 maybe a payment slip for a payment statement of bill, an advertisement acceptance form, acknowledgement of funds transfer, or numerous other slip forms depending on the propose of the printed material in section 84. Those skilled in the art will devise designs suitable to their communication needs. Changes to the location of perforations 35 and 75 will change along with design changes. The bottom side of panel 92 is the customer address 87.

The bottom side of panel 93 contains printed information 86 which may include but is not limited to: instructions for opening the mailpiece, making a payment with the payment slip, a method of payment such as a check, a green message related to the reduced amount of material required for the mailpiece or advertisements. The printed information in sections 84, 85 and 86 can be used for numerous purposes depending on the type of mailpiece being generated, but non-limiting examples include statements, advertisements, coupons, customer alerts, and instructions. Glue strips are applied in the perforation and glue section 150. If pressure glue is used, either glue strips 20, 22 or 33, 34 are applied. Both strips 30 and 32 are not needed for pressure sensitive glue. Other glue options are possible such as contact glue which will only bind when the opposite glue strip comes in contact. In this case, all six strips maybe applied. The business reply envelope 700 is placed on the panel 93 before the wrapping section 103 (FIG. 1). The glue is applied with a jet system or a roller with a glue applicator. Those skilled in the art will adapt existing application technology based on the application requirements. The outbound mailpiece 170 is formed by first wrapping panel 94 on top of panel 93 along fold line 45 to enclose the return envelope and then wrapping panel 92 along fold line 40 to form the finished mailpiece. Following the wrapping section 103, perforation rollers 155 are used to form the perforation lines 61 and 62 by cutting perforations through the closed mailpiece. The outbound mailpiece 170 (FIG. 1) is cut from the continuous web 141a with cutter rollers 160. Perforations 61 and 62 are required as tear lines to remove the glue strips and open the mailpiece by the customer.

FIG. 3 identifies an exemplary illustration of the component parts needed to form a finished mailpiece 170. The processes as identified maybe performed by separately run processes done at different times or even by different companies. The process starts with a blank paper roll 330. Perforations 35 maybe applied to the blank roll of paper 330 with a perforation wheel system 340. Depending on the production setup, the paper web from roll 330 may be rerolled 332 before being loaded onto the printer 333 or sent directly into the printer 333. The printer 333 maybe duplex and color or black and white as required for form 95 FIGS. 2A, 2B The printer output is rerolled 140 for use by the wrapping document processing system 100 or fed directly into the system 100. The optional printing system 145 is not shown.

The subcomponents of the perforation and glue system 150 have numerous component types and features that are available and configurable by those skilled in the art to perform the functions dictated by the type of form to be processed. The functions of system 150 illustrated in FIG. 3 are in reference to form 95 (FIGS. 2A, 2B). Perforation 75 is formed by perforation rollers 156 to the paper web 141. Optional glue lines 30 and 32 are applied with spraying system 345. These glue lines are often omitted since they may interfere with the inclusion of the return/reply envelope 700 or inserts by the document and insert subsystem 102. A glue applicator 340 applies the pressure sensitive glue strips 21, 22 and 33, 34. Spraying, wiping, and rolling glue onto the paper web are common methods, but the application process is not limited to these methods. The wrapping section 103 will accept the return envelope 700 and inserts and fold panel 94 along fold line 45 onto panel 93 and seal the pressure sensitive glue strips 21 and 22. The next stage wraps panel 92 on top of panel 94 alone fold line 40 and seals the glue strips 33 and 34. Crosswise perforations 61 and 62 are created by the perforation rollers 155 and then the outbound mailpiece is cut from the continuous web 141a FIG. 1 with cutter rollers 160 to form the finished mailpiece 170.

FIG. 3A is a representative glue application system 340 and 345 as shown in FIG. 3. The figure depicts an example of a melter 1 such as a ProBlue® melter make by Nordson Corporation. The melter 1 liquefies solid form hot melt and maintains the hot melt at the desired temperature. When the glue jets 2 are activated, the melter pumps the liquefied hot melt through the hoses 3 and out the jet nozzles, where it is applied to the upward facing side form 80. The melt and pump solid form hot melt materials are engineered to be liquefied and extruded at temperatures below 230 degrees Celsius. The glue system is included in the perforation and glue system 150.

Figure 3B:
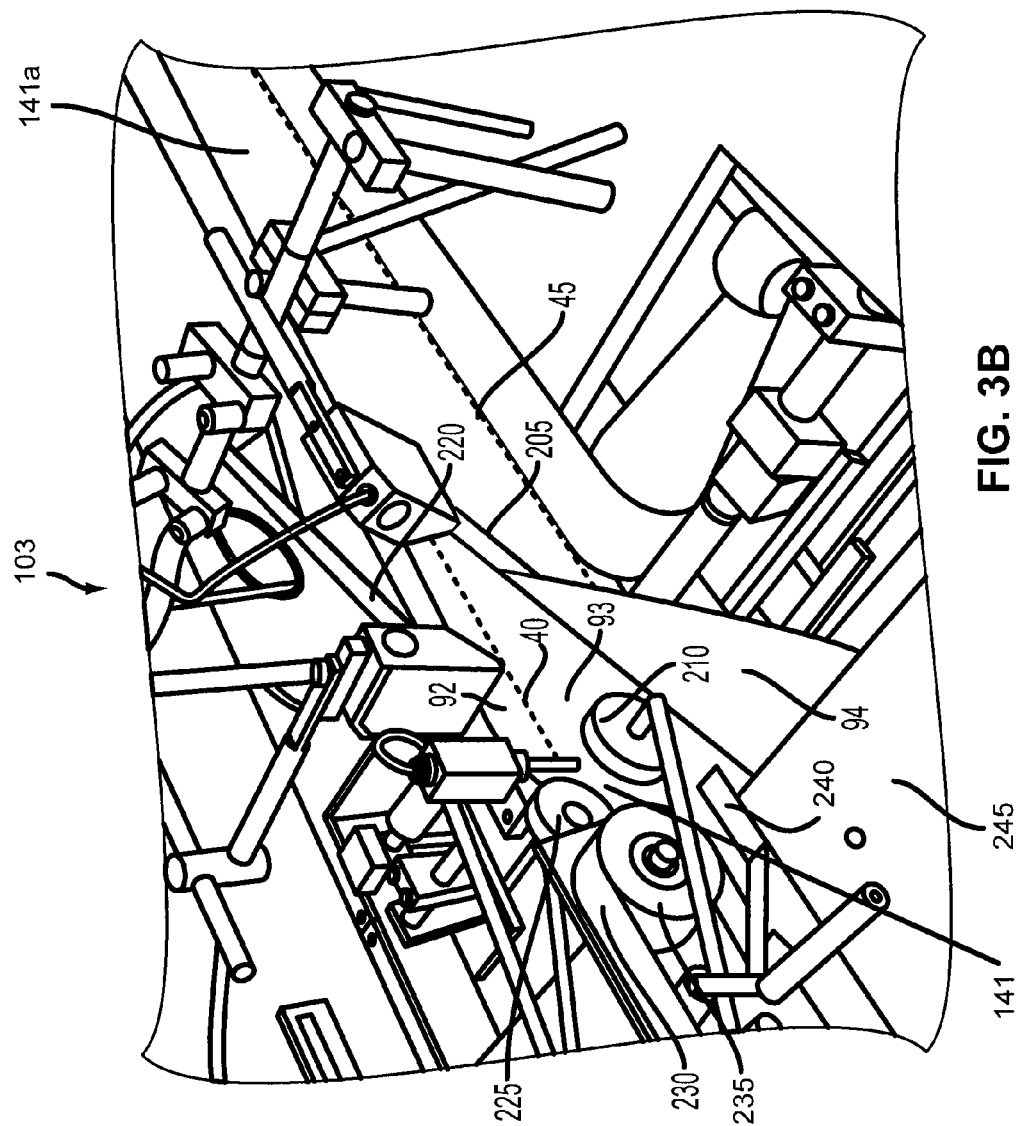
FIG. 3B is a representative drawing of a portion of a wrapping system.

FIG. 3B is a representative drawing of a wrapping system 103 which has an input of the continuous paper web 141 and outputs a continuous paper web 141a that has been folded and sealed and is ready to be cut into individual mailpieces 170 (FIG. 1). The continuous paper web 141 enters the wrapping system 103 from below the deck plate 245 after glue and crosswise perforation 75 have been added. The fold line 45, which is between panels 93 and 94, is formed by the creasing and twisting action created between roller 210 and guide member 205. The return/reply envelope 700 and optional inserts (not shown) are inserted onto panel 93 by belt 230 and pulley 235 systems. A bottom belt (not shown) is used below belt 230 to ensure that the inserts are moving at the same speed as the continuous paper web 141. Guide fingers 240 are used to ensure that the return envelope 700 and inserts are placed flat and oriented correctly as they are placed on the continuous paper web 141. Similarly, fold line 40, which is between panels 92 and 93, is formed by the creasing and twisting action created between roller 225 and guide member 220. The continuously moving paper web and return envelope plus inserts that transition into a wrapping system 103 enable higher throughput (i.e. mailpieces manufactured per hour) than can be achieved by conventional envelope inserters.

Figure 4:
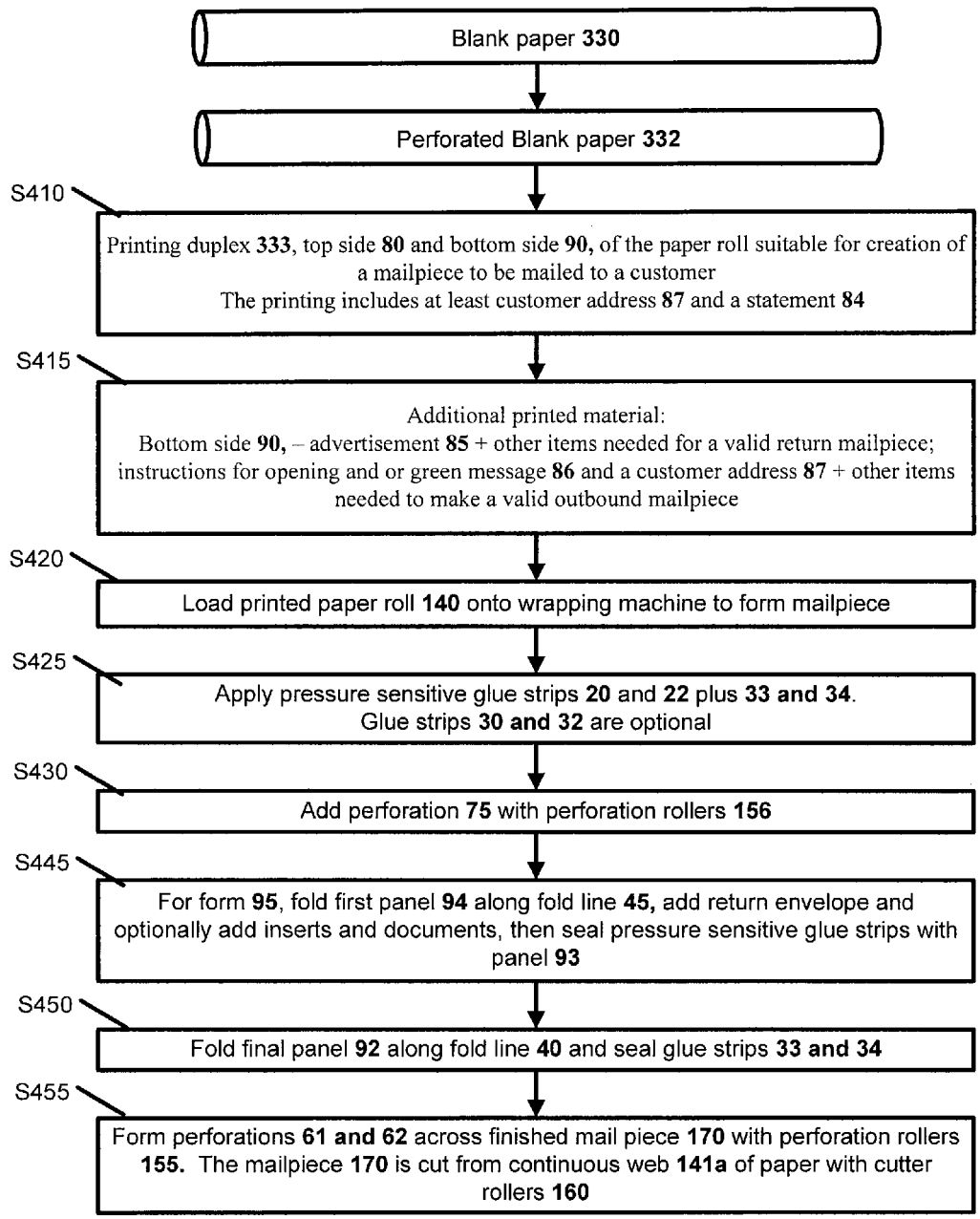
FIG. 4 is an exemplary process flow of the paper roll creation and wrapping document processing system operational steps.

FIG. 4 is a process flow of the paper roll 140 creation and the wrapping document processing system 100 operational steps. This process will produce a mailpiece from a sheet of paper which is cut from a continuous web 141 of paper after the mailpiece is created. Steps S410 and S415 involve the creation of the printed material to be processed on the wrapping document processing system 100. The process starts with a blank paper roll of paper 330. If perforation 35 is required, a perforated blank roll of paper 332 may be desired for the production process. Step S410 defines the duplex printing of the top side of the paper, form 80 and the bottom side of the paper with form 90 which are printed on the roll of paper 332. The roll of paper 332 may have a longitudinal perforation 35, as required by the applications being run on the wrapping document processing system 100. The bottom side form 90 will have at least the customer address and the return address. Step S415 defines the additional printed material that may be added to the printed roll. For the bottom side 90 printing may include, but is not limited to, an advertisement 85, instructions for opening the mailpiece, a green message 86, and a customer address 87. Other printed items needed or desired to make a valid outbound mailpiece may be added.

Steps S420 through S455 are performed by the wrapping document processing system 100. The paper roll 140 is loaded onto the wrapping machine 100 in step S420. The paper roll 140 contains the duplex printed form 95, plus perforations and glue strips as required by the application.

The pressure sensitive glue strips 20, 22 and 33, 34 are applied in step S425. If required, glue strips 30, 32 are applied. If optional printing is used, this step is performed between steps S420 and S425. In step S430, the crosswise perforation 75 is applied. The wrapping and folding process is performed on the continuous web 141 of paper forms in step S445. For form 95 (FIG. 2), the first panel 94 is folded along fold line 45 and return/reply envelope 700 and optional inserts plus documents 123 are added before the seal pressure sensitive glue strips 20, 22 are sealed with panel 93. In Step S450, mailpiece 165 is formed by folding panel 92 along fold line 40 and then sealing the glue strips 33 and 34.

In Step S455, perforations 61 and 62 are formed across the mailpiece with perforation rollers 155 and the mailpiece is cut from continuous paper web 141 with cutter rollers 160 to produce an individual outbound mailpiece 170. The order of and processes contained in individual steps may be changed by those skilled in the art to accommodate different form structures and wrapping document processing system configurations.

As shown by the above discussion, functions relating to the preparation of the mailpiece may be implemented on one or more computers operating as the control processor 200 connected for data communication with the processing resources as shown in FIG. 1. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the workflow templates for a number of production jobs as well as the various files for tracking data accumulated during one or more productions runs. The software code is executable by the general-purpose computer that functions as the control processor 200 and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for generating an integrated mailpiece, in essentially the manner performed in the implementations discussed and illustrated herein.

Figure 5:
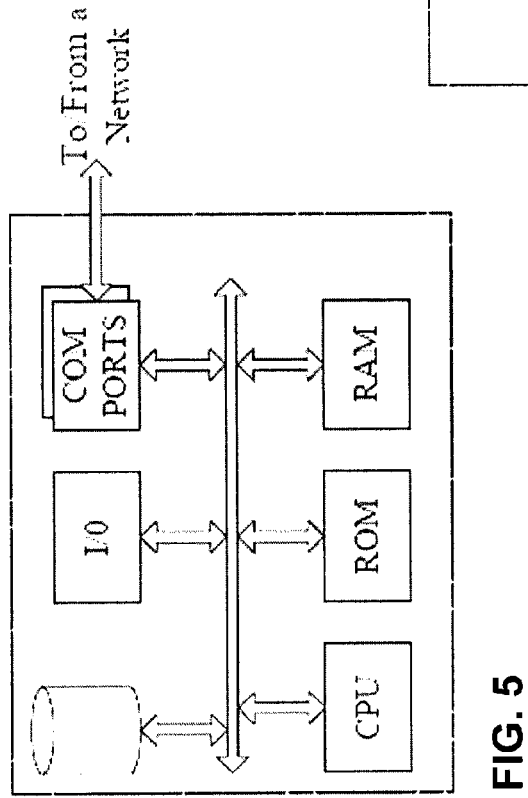
FIG. 5 illustrates a network or host computer platform, as may typically be used to implement a server.
Figure 6:
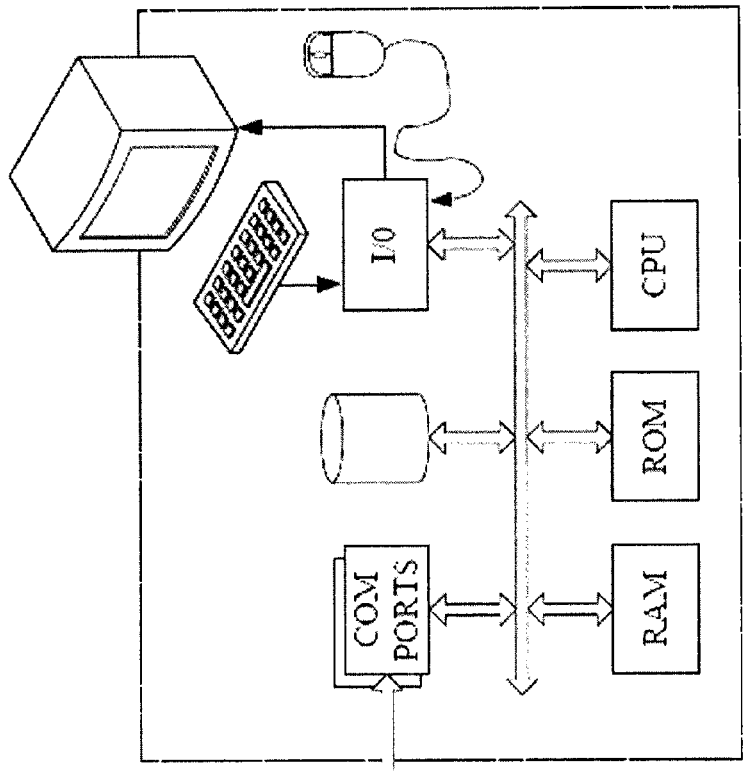
FIG. 6 depicts a computer with user interface elements, as may be used to implement a personal computer or other type of work station or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and, as a result, the drawings should be self-explanatory.

For example, control processor 200 may be a PC based implementation of a central control processing system like that of FIG. 6, or may be implemented on a platform configured as a central or host computer or server like that of FIG. 5. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for generating an integrated mailpiece, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps regarding the manufacturing of an integrated mailpiece, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A mailpiece assembled from a continuous web of paper by way of a wrapping document processing system, the mailpiece having outgoing and reply envelope functionality and comprising:

a prepared reply envelope loosely inserted and wrapped inside the continuous web of paper by the wrapping document processing system such that the reply envelope is not fixed to the continuous web of paper;
   wherein the continuous web of paper includes printed material on first and second sides thereof, the printed material including:
      a first address printed on the first side of the continuous web of paper, the first address associated with the outgoing mailpiece, and
      information for a detachable return slip printed on the second side of the continuous web of paper,
      wherein a width of the detachable return slip is smaller than a width of the reply envelope such that the return slip, once detached from a detachable and disposable section of the return slip, is configured to fit in the reply envelope in an unfolded state;
   a plurality of unperforated wrapping lines extending across a width of the continuous web of paper such that the continuous web of paper is creased therealong by the wrapping document processing system, wherein the first side of the continuous web of paper forms an exterior of the mailpiece; and
   at least one adhesive region positioned on at least the second side of the continuous web of paper,
   wherein the mailpiece comprises first and second perforated lines, each of which are parallel to and adjacent respective opposing long edges of the mailpiece before folding along the wrap lines,
   wherein the mailpiece comprises three panels which are, in an assembled state, folded so an upper first panel and a lower third panel are on a first side of the return envelope, with a middle second panel being on a second side of the return envelope,
   wherein the first address is printed on the upper first panel, and
   wherein the return slip comprises an area on the lower third panel bounded by:
      a portion of the first perforated line,
      a horizontal perforated line extending at least between the first and second perforated lines and substantially parallel to the wrapping lines,
      an outer edge of the continuous web of paper, and
      a third perforated line and a non-perforated stop, both of which are substantially co-linear, substantially parallel to the first perforated line, and disposed internal to the second perforated line in a direction of the portion of the first perforated line,
      wherein the third perforated line is shorter in length than the portion of the first perforated line, wherein the non-perforated stop is in contact with the outer edge of the continuous web of paper and extends in a direction of and contacting the third perforated line, wherein the non-perforated stop is configured to prevent a tearing of the third perforated line during high speed wrapping document processing, and wherein the third perforated line and the non-perforated stop together have a same length as the portion of the first perforated line.

2. The mailpiece according to claim 1, wherein the reply envelope is an addressed reply envelope having a second address different from the first address.

3. The mailpiece according to claim 1, wherein the perforated lines are configured for opening the assembled mailpiece.

4. The mailpiece according to claim 1, wherein the at least one adhesive region comprises a plurality of glue strips extending across the second side of the continuous web of paper.

5. The mailpiece according to claim 1, further comprising one or more pages of assembled inserts to be included inside the mailpiece in the assembled state, wherein the one or more pages of inserts are inserted on the continuous web of paper prior to the one or more pages of inserts being wrapped by the wrapping document processing system, such that the one or more pages of inserts are not fixed to the continuous web of paper.

6. The mailpiece according to claim 1, further comprising a personalized communication printed only on the second side of the continuous web of paper, the personalized communication being associated with an addressee identified in the first address, and the personalized communication comprising a billing statement, advertisement, or banking statement.

7. The mailpiece according to claim 1, wherein the detachable return slip comprises a change of address request slip, a payment slip, an invoice slip, an advertisement and acceptance slip, or an acknowledgement of funds transfer slip.

8. The mailpiece according to claim 1, wherein the plurality of unperforated wrapping lines extending across the width of the continuous web of paper are configured to be formed by twisting and wrapping the continuous web of paper between one or more roller and guide member to form two creases prior to the mailpiece being cut from the continuous web of paper.

* * * * *